United States Patent [19]

Ballantyne et al.

[11] Patent Number: 5,133,079
[45] Date of Patent: Jul. 21, 1992

[54] METHOD AND APPARATUS FOR DISTRIBUTION OF MOVIES

[76] Inventors: Douglas J. Ballantyne, 21 Horner Dr., Nepean, Ontario, K2H 5E6, Canada; Michael Mulhall, 28 Carlyle Ave., Ottawa, Ontario, K1S 4Y3, Canada

[21] Appl. No.: 573,707

[22] Filed: Aug. 28, 1990

[30] Foreign Application Priority Data

Jul. 30, 1990 [CA] Canada ................................. 2022302

[51] Int. Cl.⁵ ........................... H04H 1/02; H04N 7/10
[52] U.S. Cl. ...................................... 455/4.1; 358/86; 358/335; 455/5.1; 455/72
[58] Field of Search .......................... 455/3, 5, 6, 72, 4; 358/86, 102, 142, 146, 133, 335; 381/34, 35, 30, 31; 370/110.1, 109; 360/8, 13, 15; 369/30

[56] References Cited

U.S. PATENT DOCUMENTS

| | | | |
|---|---|---|---|
| 4,787,085 | 11/1988 | Suto et al. | 370/110.1 |
| 4,920,432 | 4/1990 | Eggers et al. | 360/33.1 |
| 4,949,170 | 8/1990 | Yanagidaira et al. | 358/86 |
| 4,949,187 | 8/1990 | Cohen | 358/335 |
| 4,961,109 | 10/1990 | Tanaka | 358/84 |
| 4,963,995 | 10/1990 | Lang | 358/335 |
| 4,975,771 | 12/1990 | Kassatly | 358/146 |

Primary Examiner—Curtis Kuntz
Assistant Examiner—Chi H. Pham
Attorney, Agent, or Firm—Burke-Robertson

[57] ABSTRACT

A new and useful method and apparatus for distribution of movies for viewing on a customer's television set. Digitized compressed signals containing audio and visual components of the movie selected by the customer are sent to the customer's receiver. The digital signals are converted to corresponding electronic signals; which are decompressed and converted to audio and video signals. These converted signals are passed to a conventional television set for viewing by the customer.

16 Claims, 6 Drawing Sheets

METHOD AND APPARATUS FOR DISTRIBUTION OF MOVIES

BACKGROUND OF THE INVENTION

The present invention relates to a method and apparatus for distribution of movies to a customer's home, and more particularly to an electronic system whereby movies may be selected from a central library, from a customer's home and supplied electronically to that home for subsequent viewing at a time determined by the customer, on that customer's television set.

At the present time, commercial movies selected by a customer for home viewing are conventionally provided on cassette tapes in electromagnetic form. These tapes are often rented for a short period of time by the customer at a video cassette shop, taken to the customer's home and played there on a video cassette player electronically connected to the customer's television. This method of delivery of movies to a customer's home requires the customer to have a video cassette player and requires the customer actually to go to a video cassette rental shop to select the movie to be played.

It is an object of the present invention to provide a system which will avoid the need for a customer to leave home to select a movie, and as well avoid the need for a video cassette player at the customer's home to enable the viewing of a selected movie. It is a further object of the present invention to provide a novel method and apparatus to electronically distribute movies selected by a customer to the customer's home from a central location.

SUMMARY OF THE INVENTION

In accordance with the present invention there is provided a method for distribution of movies for viewing on a customer's television set. The method comprises the steps of sending digitized compressed optical signals containing audio visual data corresponding to the movie selected by the customer from a source to the customer's receiver over a fibre optic network, passing the optical signal to an optical converter to convert the optical signal to corresponding electronic signals, passing the electronic signals to processors where they are decompressed and converted to audio and visual signals compatible with conventional television sets, and passing these converted signals to a conventional television set for viewing by the customer.

A preferred embodiment of the method according to the present invention additionally includes the step wherein the signals from the optical converter are stored in memory means for retrieval and passage to the signal processors for decompression and a single viewing on the television set at a time selected by the customer.

As well, in accordance with the present invention there is provided an apparatus for enabling a customer to electronically receive and play on a television set a pre-determined movie. The apparatus comprises a receiver to receive from a source, data in digitized compressed optical signal format containing audio visual data corresponding to the movie. An optical converter is electronically associated with the receiver to convert the optical signal data to corresponding electronic signals. A video processor is electronically associated with the optical converter to receive the video electronic signals, decompress them and convert them to electronic video signals compatible with the television set to provide a video image of the movie on the television set. An audio processor is electronically associated with the optical converter to receive the audio electronic signals from the optical converter, decompress them and convert them to electronic audio signals compatible with the television set to provide an audible sound track of the movie through the television set with the video processor and audio processor electronically associated with the television set.

The present invention provides a novel method and apparatus to electronically distribute movies for viewing to a customer's home from a central or regional library. This may be achieved for example through existing coax cable or fibre optic networks. If coax cable is used, electrical to optical conversion, as described in the previous paragraphs, is not required. A customer may, from his or her own home, electronically access the central library, select a movie to be viewed and have the movie electronically sent to the customer's receiver in compressed form where it is then decompressed and played on the customer's television set or stored for subsequent viewing.

BRIEF DESCRIPTION OF THE DRAWINGS

These and other objects and advantages of the invention will become apparent upon reading the following detailed description and upon referring to the drawings in which.

While the invention will be described in conjunction with an example embodiment, it will be understood that it is not intended to limit the invention to such an embodiment. On the contrary, it is intended to cover all alternatives, modifications and equivalents as may be included within the spirit and scope of the invention as defined by the appended claims.

DETAILED DESCRIPTION OF THE INVENTION

Figure 1A:
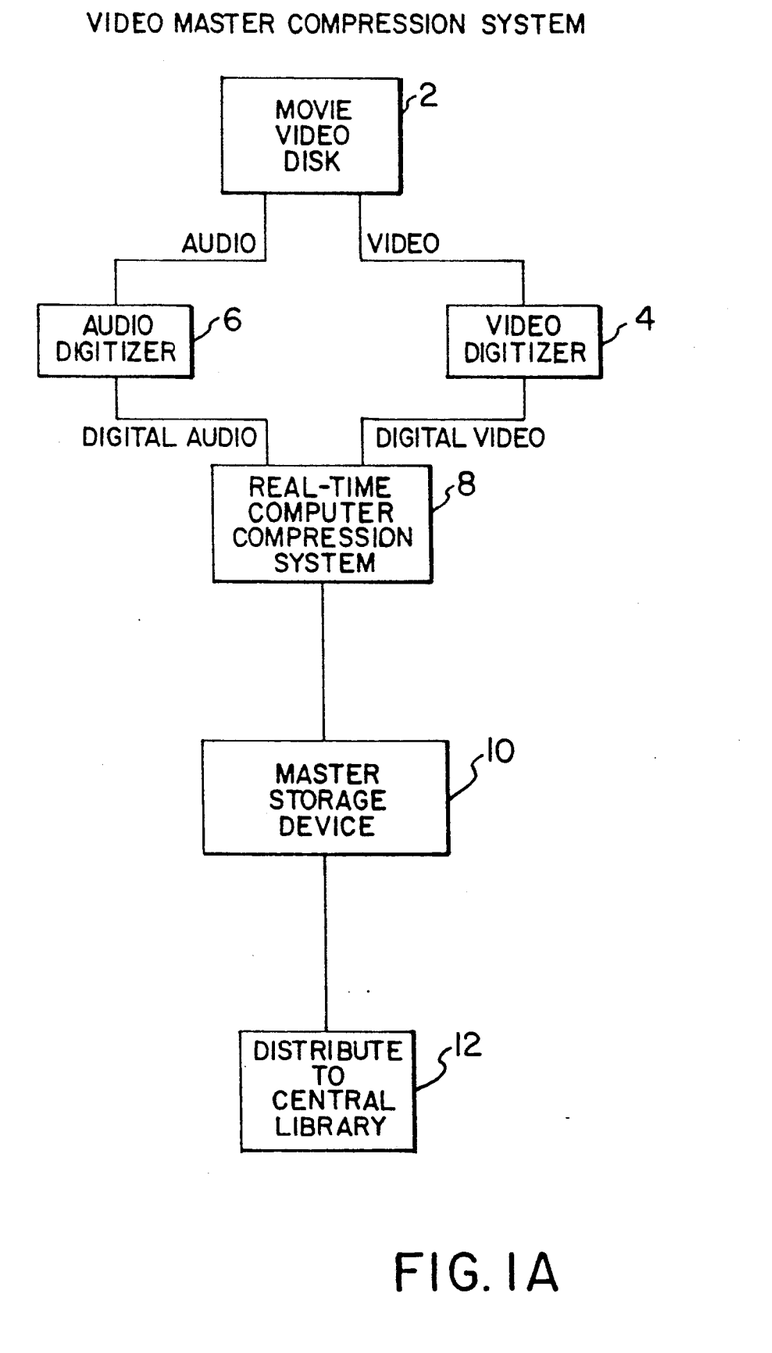
FIGS. 1A and 1B constitute a flow chart illustrating the manner in which movies are prepared for storage and stored in a distributor's library, and accessed there by a customer, in accordance with the present invention.
Figure 1B:
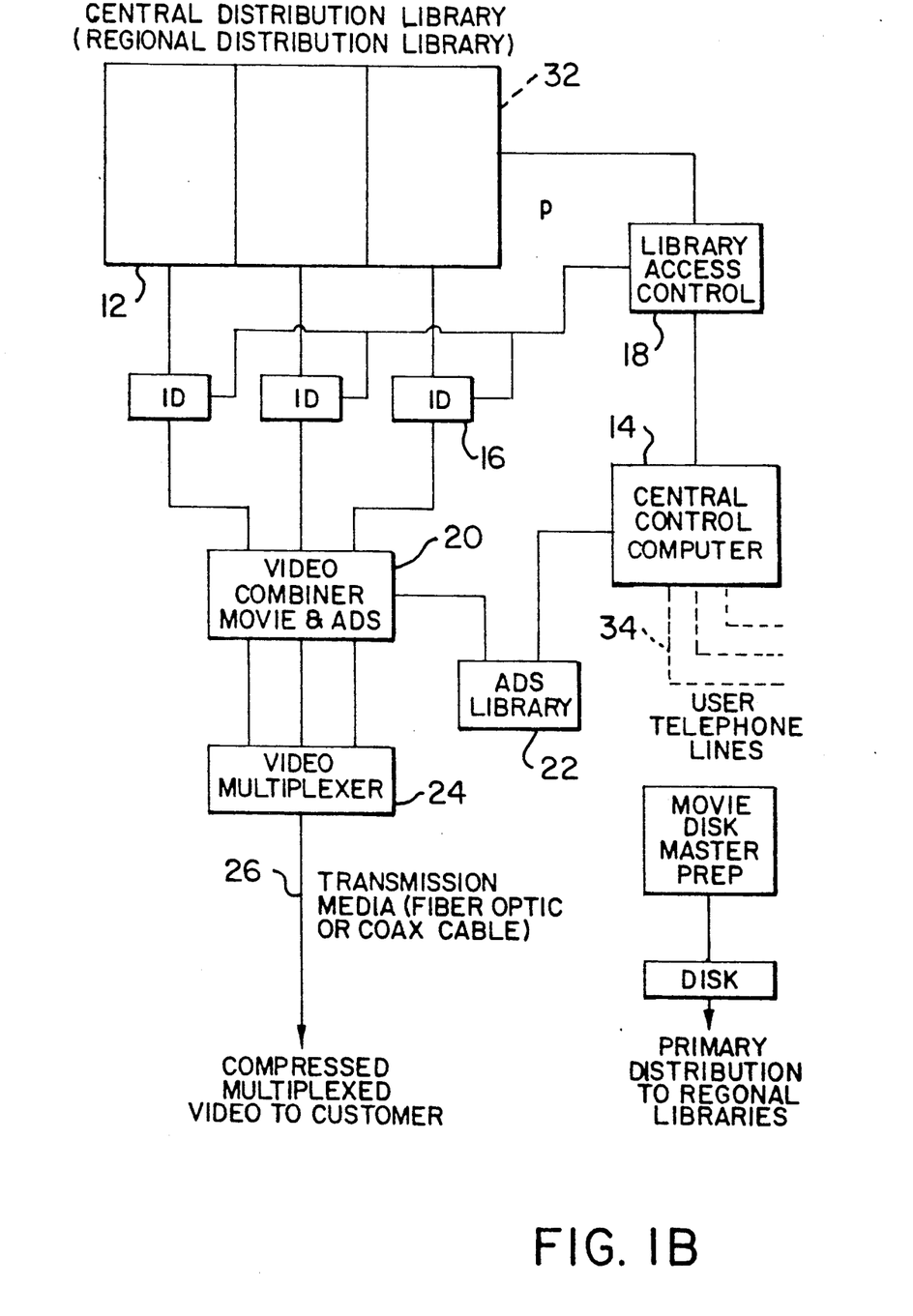

The present invention relates to a commercial movie distribution system consisting of a central distribution centre comprised of a video master compression system and a digital movie data bank library, illustrated in more detail in FIGS. 1A and 1B. Located at the customer's site is a compatible digital video storage system (FIGS.

2 - 6) facilitating movie playback in real-time on the user's television unit.

1. Video Compression Mastering Process

Turning to FIGS. 1A and 1B, a complete motion picture movie is received on laser disks (2) either in conventional video analog or digital format. Typically, video output is in real-time at 30 frames per second portraying full motion effects with synchronized stereo audio. The video and audio signals are digitized with separate video and audio analog to digital converters (4 and 6 respectively) and input to the computer compression system (8).

The computer compression system (8) consists of a typical P.C./A.T. computer with a CD-ROM drive and special purpose software. The system captures and compresses motion video in real-time and stores the compressed video on the CD-ROM at a reduced frame rate. A typical data compression factor of 150:1 will give the following level of data reduction:
Conventional video frame in digital form
  512 × 480 pixels = approximately 750 kbytes
Compressed video frame at 150:1 compression
  5 kbytes/frame
Compressed video storage requirements for a typical 2 hour movie
  5 kbytes/frame
  30 frames/sec.
  150 kbytes/sec.
  9000 kbytes/min.
  1.08 Gbytes/2 hrs.

The master storage device (10) must have the capacity to store the required amount of compressed data for the entire duration of the movie, as received from computer compression system (8). Various technologies can be utilized for this storage device. The following lists several such technologies as well as their present capacities.

| CD-ROM | Mode 1 | 660 Mbytes |
| --- | --- | --- |
|  | Mode 2 | 750 Mbytes |
| WORM |  | 200 Mbytes |
| Hard Disks |  | 100 Mbytes |
|  |  | * |
|  |  | * |
|  |  | * |
|  |  | 1 Gbyte |
| Solid State Memory |  | 2 Mbytes |

These technologies can be grouped individually to ensure sufficient storage capacity or a combination of different technologies can be utilized. However, the actual technological combination must be portable enough to allow distribution to the Central Distribution Library (12).

2. Central Distribution Library

Illustrated in FIG. 1B, the Central Distribution Library (CDL) (12) is the central depository for the compressed movie data from the video master compression system. It is arranged such that each movie type has a unique identification code that is appended to the digital video data when it is initially entered into the library. The data is retrieved in digital format and at a very high rate such that the data from a 2 hour movie can be transmitted in a very short time duration. Because the data is compressed, it actually appears as if it is scrambled, thus allowing a secure transmission of proprietary movie information.

Central control computer (14) is responsible for the access control of the library and all interaction with the user. Initial user requests are taken either through CDL operator intervention or totally automatic by means of the digital telephone system. In either case, the movie is requested by using its unique identification number (ID) (16). After verification of the customer's credit and/or membership card number, confirmation is given to the user as to the movie to be transmitted and the actual time of transmission. User requests are queued as the demand increases. Confirmation of the transaction (i.e. movie title, time of transmittal, etcetera) may be provided on the screen of the user's television set. The central control computer (14) also automatically collects statistics (busy time periods, most frequently requested movie, etc.) and performs all accounting requirements.

The library access control (18) contains a record of where the relevant movies are located within the library and requests data transmission when a specific movie is requested. It is also responsible for appending the user identification number (UIN) to the requested movie to ensure the correct distribution of the movie is completed.

The video combiner (20) makes it possible to mix specific advertisements, previews of additional movies, etc. to each movie being transmitted. It also generates an error check code to enable the re-generation of lost data due to poor transmission interconnections.

As an option, an advertisement library (22) may be provided which contains a repository of digital video ads that have been authored by the master video compression system. These ads can be custom created and can be specifically transmitted on a daily basis, only during busy periods, only with respect to specific movies (environmentally conscious advertisements), etc.

The compressed digital video is then converted into light energy to facilitate the transmission over a fibre optic communication network. If standard coax cable is used, this optical conversion is not required. The data may also be multiplexed at multiplexer (24) with respect to light wavelength enabling the transmission of several movies at the same time. (This is not feasible if coax cable is the transmission media.)

The compressed multiplexed movie data is then broadcast over a wide area fibre optic network (26) for user distribution.

As illustrated in FIG. 1B, a regional distribution library (32) of similar make-up to Central Distribution Library (12), but accessible through customer or user telephone lines (34) as illustrated, is preferably provided in each of the geographical areas to be provided with a commercial movie distribution system in accordance with the present invention.

Figure 2:
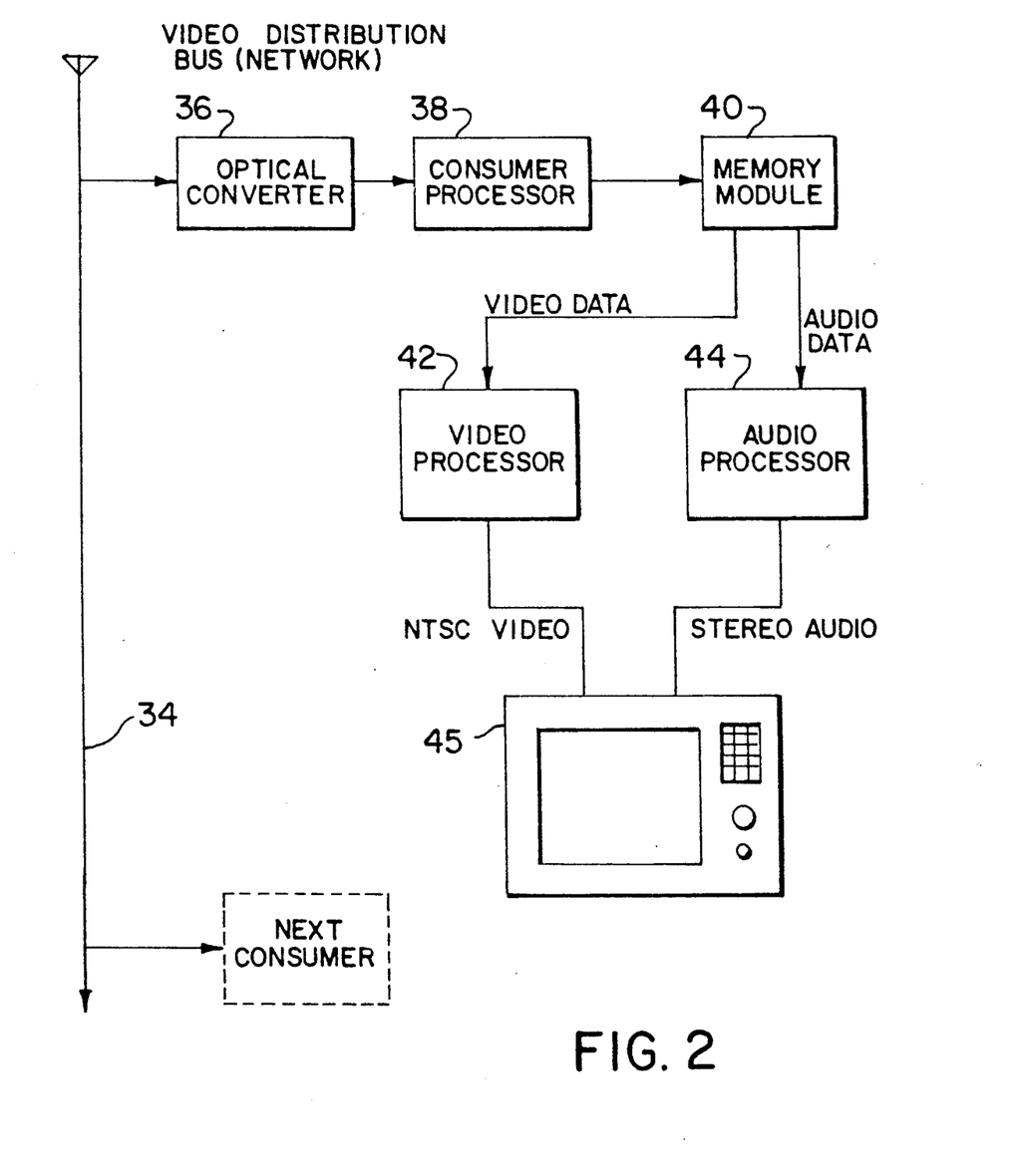
FIG. 2 is a schematic diagram of the method of and apparatus for retaining movies at a customer's location for viewing on the customer's television set, in accordance with the present invention.

Turning to FIG. 2, there is illustrated in schematic form the digital video storage and movie playback system at the customer's location, where transferred movie data from the central or regional distribution library is transferred to be played back at a desired time. This system comprises an optical converter, if a fibre optic network is used (36), consumer processor (38), memory module (40), video processor (42), audio processor (44) and the customer's television set (45). The transmission system connecting the central or regional distribution library to the customer's facility is preferably a fibre optic communication network which will serve additionally as the user's telephone lines (34). The digital movie data is transmitted at a very high rate allowing a typical two hour movie to be transmitted in several minutes. Digital data bit error correction is performed, as will be described in more detail hereinafter, at the customer's facility to restore the integrity of the data after transmission.

Figure 3:
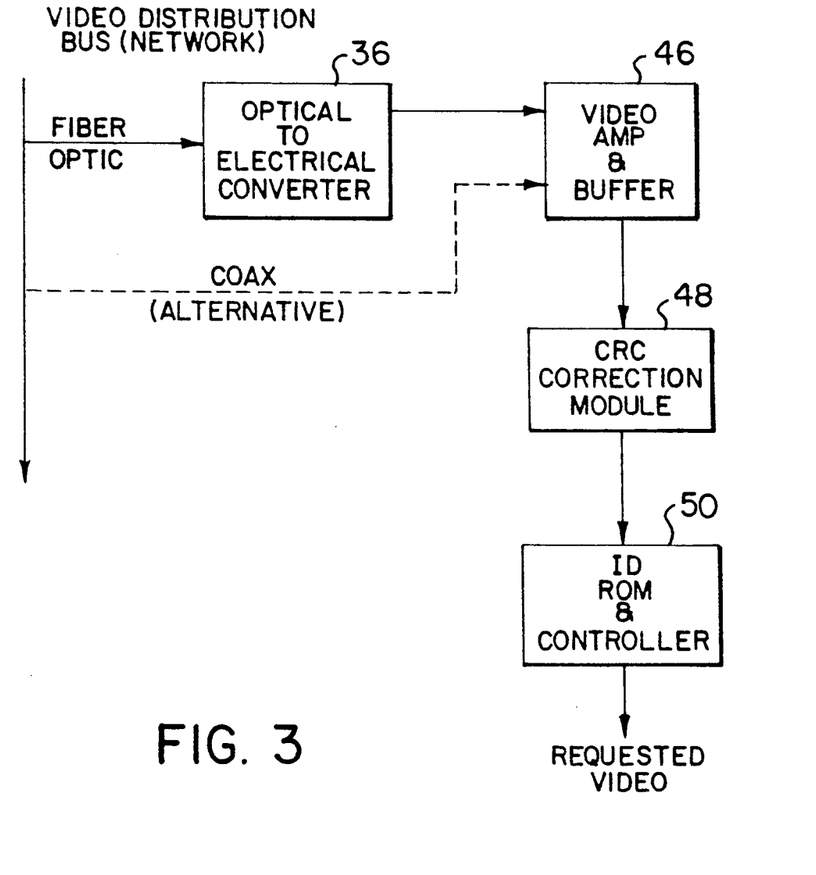
FIG. 3 is a schematic diagram of apparatus to be used by a customer in receiving and converting electronic signals from a distributor's library, for subsequent viewing on a television set.
Figure 4:
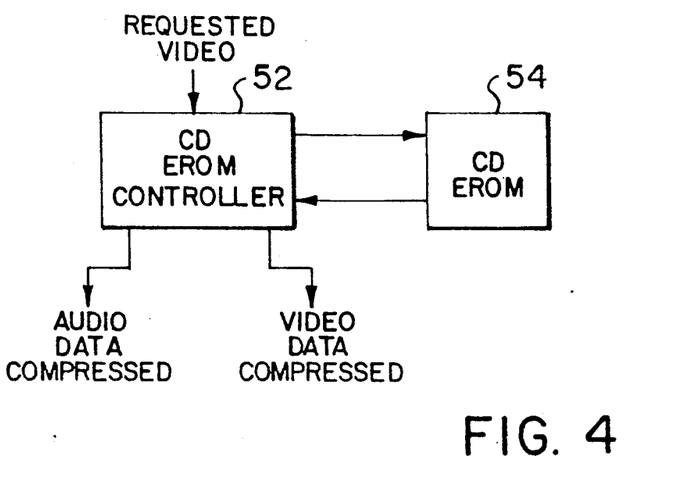
FIG. 4 is a schematic diagram of apparatus for use in storage of signals through the apparatus of FIG. 3.

As can be seen in more detail in FIG. 3, a signal from transmission line (34) passes to optical converter (36) which is preferably an optical-to-electrical converter photo diode module (available, for example, from Optical Data Systems). There the optical data is converted to electrical data. The consumer processor (38) comprises a video amplifier and buffer (available, for example, from National Semi-Conductor) intended to enhance the video signal level and act as a temporary video frame buffer memory capable of storing at least two frames of video data (approximately 10 Kbytes). The Cyclic Redundancy Code (CRC) correction module (48) (available from Texas Instruments) receives the signal from the video amplifier and buffer (46) and detects and corrects the digital video data on a frame-by-frame basis. Identification read only memory (ID-ROM) (50) (also available from Texas Instruments) contains the customer identification number (UIN). This UIN value is checked against the UIN number tagged to the distributed video movie, and if a match occurs, the signal is passed for further processing to the compact disc erasable read only memory (CD-EROM) controller (52) (FIG. 4). This controller (available from Sony Corp.) stores and retrieves the video digital data from the physical compact disk. Once the entire video data has been read from the disk it is erased, preventing further replay. There is no limitation as to the length of the time of storage, but the data can only be replayed once. The video data is still in compressed form rendering it unusable if copied, at this stage. Controller (52) outputs audio and video data as illustrated. Associated with controller (52) is a physical compact disk erasable read only memory (CD-EROM) (54) (available from Sony Corp.) which at the present state of technology development has the capacity of storing 600 Mbytes of digital data.

Figure 5:
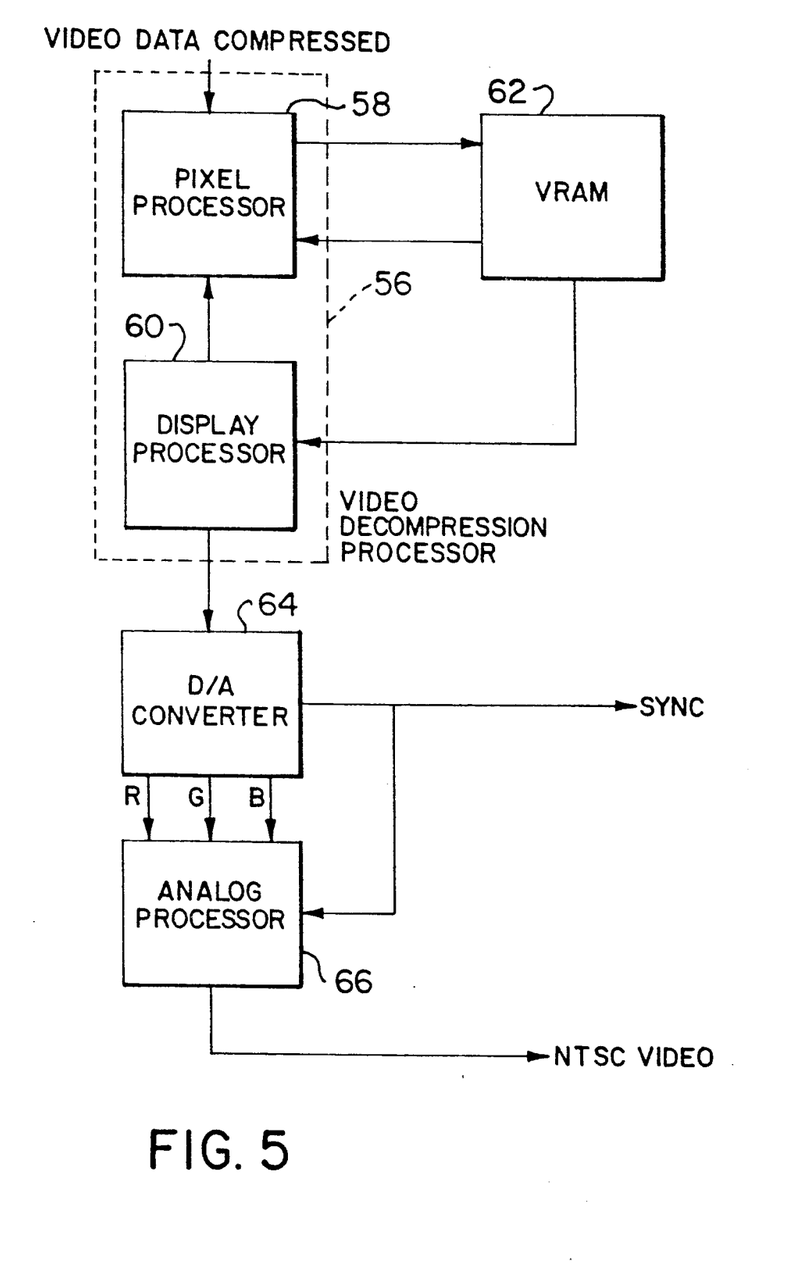
FIG. 5 is a schematic diagram of apparatus to be used to convert the compressed video signals received by a customer into signals to provide for the video display on the customer's television set.

Video data form controller (52) is passed, when desired by a customer, to video decompression processor (56) which comprises two microprocessors, a pixel processor (58) and an output display processor (60) (both available from Intel Semiconductor), configured as illustrated in FIG. 5. These are responsible for converting the compressed video data to conventional video signals. The special decompression algorithms are inherent in these microprocessors.

Video random access memory (VRAM) (62) (available, for example from Toshiba) is a type of digital memory that has two ports, one with random access for storing data at any memory location and the other, a serial port to output data at a high rate compatible with television scanning techniques. Activity at either port is independent of the other. VRAM (62) is electronically associated with pixel processor (58) and display processor (60) as illustrated.

The digital-to-analog (D/A) converter (64) receives the signal from video decompression processor (56) as illustrated, and converts the digital video data into analog data that can be used by, for example, colour RGB monitors. Analog processor (66) converts the RGB output from D/A converter (64) into contemporary or NTSC colour television format to be viewed on a conventional television set (45).

Figure 6:
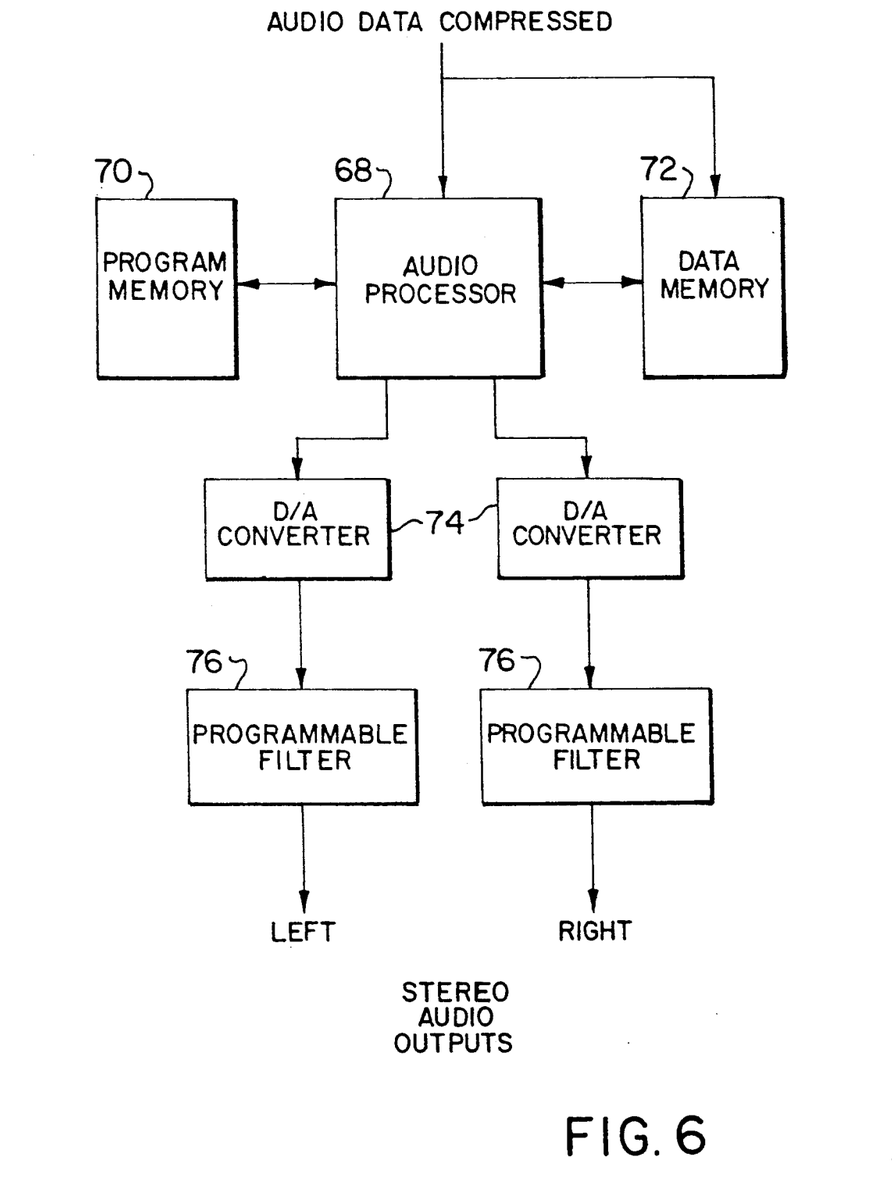
FIG. 6 is a schematic diagram of apparatus to be used to convert audio signals received by a customer into signals to produce the movie's audio tract on the customer's television set.

Compressed audio data from controller (52) is passed, as required, to audio processor (68) (available from Texas Instruments) which decompresses the retrieved audio data. Program memory module (70) (also available from Texas Instruments) stores the operations program of audio processor (68) to perform the decompression process. Data memory module (72) (also available from Texas Instruments) temporarily stores the audio data from controller (52) if required.

The digital-to-analog (D/A) converters (74) translate the digital decompressed audio data to analog and programmable filters (76) smooths out any D/A conversion anomalies that can distort the final output. Full stereo output is available as illustrated. While a conventional television (45) that requires NTSC video format for viewing is illustrated, it should be noted that the video processor will also support future digital television video formats.

3. Operation

In operation, a customer requests the delivery of a desired movie by phoning the central distribution centre or regional distribution centre (12) and identifying the movie with an identification code unique to the movie. Membership and credit card validation is then requested and if authorized, movie distribution is initiated. At the start of transmission, the customer's UIN is appended to the video being distributed. This UIN is embedded in the customer video storage system (at the customer's location) ensuring a one-to-one match between the customer and the requested movie. The customer's requests are either conveyed verbally over the phone system to a CDL operator or through an automated communication system using a touchtone key pad on a telephone handset (not illustrated).

It is a preferred aspect of the present invention that the customer's storage device allows only one replay, where upon the stored data is either erased or locked from further replay.

Thus it is apparent that there has been provided in accordance with the invention a method and apparatus for distribution of movies to a customer's home and the like that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A method for distribution of movies for viewing on a customer's television set, the method comprising the steps of:
   (a) compressing and digitizing audio visual data corresponding to an entire movie and storing the compressed, digitized data at a remote source;
   (b) sending digitized compressed signals containing audio visual data corresponding to the entire movie selected by the customer from a source to a receiver of the customer;
   (c) passing the signals to a converter to convert the signals to corresponding electronic signals;

(d) passing the electronic signals to processors where they are decompressed and converted to signals compatible with conventional television sets; and (e) passing these converted signals to a conventional television set for viewing by the customer.

2. A method according to claim 1 wherein the signals from the converter are temporarily stored in memory means for retrieval and passage to the signal processors for decompression and single viewing on the television set at a time selected by the customer.

3. A method according to claim 2 requiring the preliminary step of the customer providing a satisfactory identification electronically to the source and being cleared by the source before the digitized compressed signal is sent to the customer's receiver by the source.

4. A method according to claim 2 wherein a library of movies in digitized compressed form is maintained at the source, individual movies thereof to be selected by a customer for viewing.

5. A method according to claim 4 further comprising the preliminary step of digitizing and compressing audio visual data making up the films for storage at the source.

6. A method according to claim 1 wherein the digitized compressed signals are sent from the source in optical signal format.

7. A method according to claim 1 wherein the digitized compressed signals are sent from the source via coaxial cable.

8. An apparatus for enabling a customer to electronically receive and play on a television set a pre-determined movie, the apparatus comprising:

(a) receiver means to receive from a remote source data in digitized compressed signal format containing audio visual data corresponding to the movie;

(b) a converter to be electronically associated with the receiver means to convert the signal data to corresponding electronic signal data;

(c) a video processor to be electronically associated with the converter to receive the electronic video signals, decompress them and convert them to electronic video signals compatible with the television set to provide a video image of the movie on the television set; and (d) an audio processor to be electronically associated with the converter to receive the audio electronic signals from the converter, decompress them and convert them to electronic audio signals compatible with the television set, the video processor and audio processor to be electronically associated with the television set to provide an audible sound tract of the movie through the television set.

9. Apparatus according to claim 8 further comprising a television set electronically associated with the video processor and audio processor to receive signals therefrom.

10. Apparatus according to claim 8 further comprising memory means to be electronically associated with the converter and with the video processor and audio processor, to store and retrieve electronic signals from the converter until desired by the customer for viewing the movie on the television set.

11. Apparatus according to claim 10 wherein the signals from the converter are placed on a compact disc and wherein the memory means comprises a compact disc erasable read only memory (CD-EROM) controller to store and retrieve the electronic signals from the compact disc.

12. Apparatus according to claim 10 wherein the video processor comprises a pixel processor provided with a decompression algorithm to convert the compressed electronic video signals to conventional decompressed video signals and a video random access memory (VRAM) to be electronically associated with the pixel processor for storing data and providing output data at a high rate compatible with the television set.

13. Apparatus for electronically distributing movies to a customer's television set in conjunction with the apparatus of claim 8, comprising a video library of movies stored in digitized compressed audio visual format and computer means electronically associated with said library to provide customer electronic access to individual movies in that library and to send to said receiver means in digital signal form the digitized compressed audio visual data for a selected movie in that library.

14. Apparatus according to claim 13 further comprising electronic customer access means electronically associated with said computer means to control and document customer access to the library.

15. Apparatus according to claim 8 wherein the receiver means is adapted to receive data from the source in optical signal format and the converter is an optical converter.

16. Apparatus according to claim 8 wherein the receiver means is adapted to receive data from the source from a coaxial cable.

* * * * *